June 30, 1931. R. S. SANFORD 1,812,021
BRAKE OPERATING CONNECTION
Filed May 2, 1928
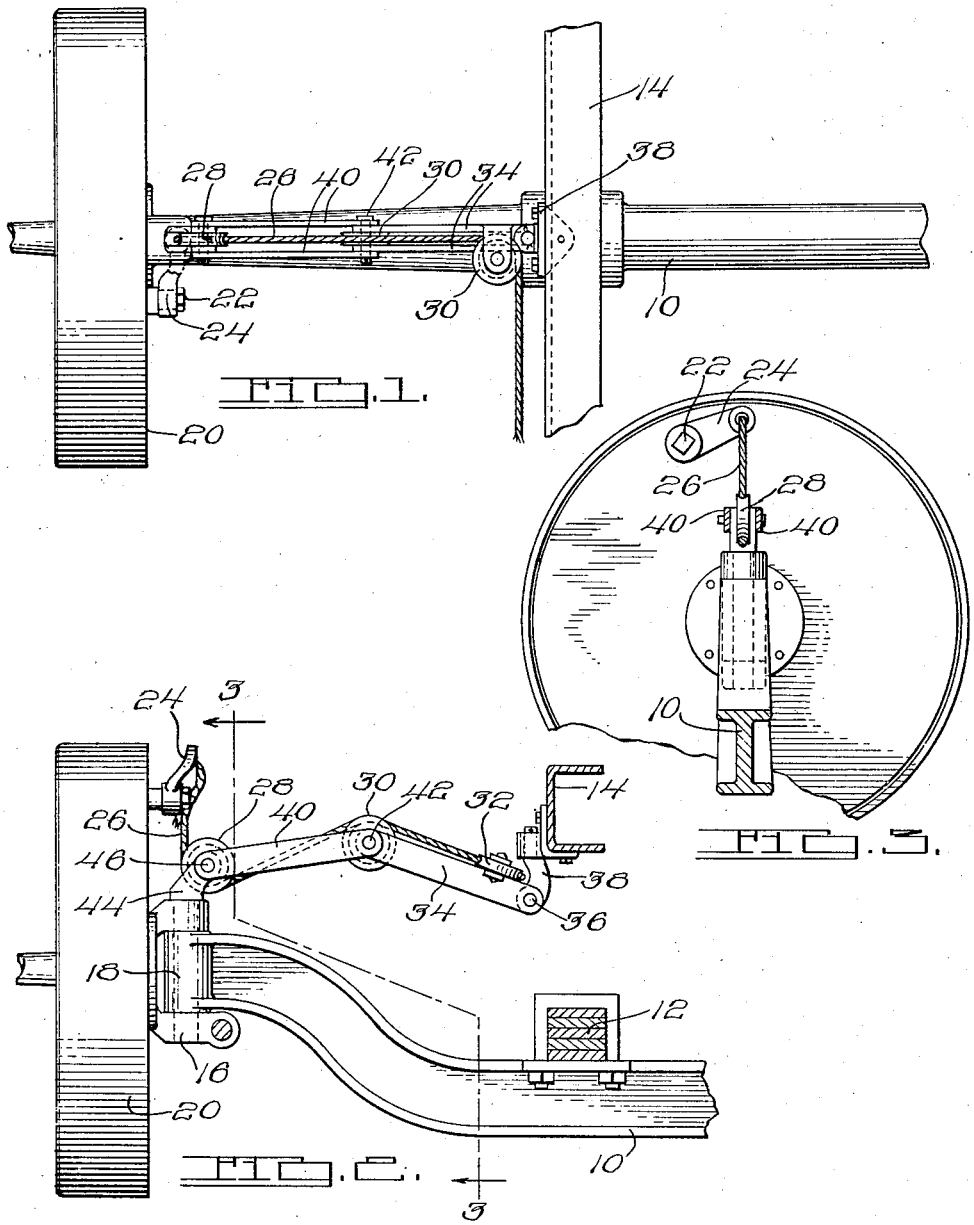
INVENTOR
Roy S. Sanford
BY
M. W. McConkey
ATTORNEY Patented June 30, 1931

1,812,021

UNITED STATES PATENT OFFICE

ROY S. SANFORD, OF SOUTH BEND, INDIANA, ASSIGNOR TO BENDIX BRAKE COMPANY, OF SOUTH BEND, INDIANA, A CORPORATION OF ILLINOIS

BRAKE OPERATING CONNECTION

Application filed May 2, 1928. Serial No. 274,531.

This invention relates to brakes and is illustrated as embodied in novel operating mechanism for a front wheel automobile brake. An object of the invention is to provide simple operating mechanism which will compensate for relative movement of the chassis frame and the front axle as well as permit the swiveling of the front wheel in steering.

In one desirable arrangement a tension element which operates the brake, and which is carried from the chassis frame to the brake, is guided over a pivoted linkage extending between the frame and the axle or wheel knuckle and which maintains the same effective length for the operating mechanism in any relative position of the frame and axle. Preferably the operating member is a flexible cable and the linkage carries suitable guide pulleys over which the cable runs.

The above and other objects and features of the invention, including various novel and desirable details of construction will be apparent from the following description of the illustrative embodiment shown in the accompanying drawings, in which:

Figure 1 is a top plan view of one end of the front axle and the adjacent parts of the vehicle;

Figure 2 is a rear elevation of the parts shown in Figure 1; and

Figure 3 is a vertical section on the line 3—3 of Figure 2 showing a brake in inside elevation.

In the arrangement illustrated, the vehicle includes the usual front axle 10 having a spring 12 supporting the chassis frame 14 and having a knuckle 16 swiveled at its end by means such as a king pin 18. The wheel (not shown) is mounted on the knuckle 16 and is provided with a suitable brake 20 operated by a cam shaft 22 or its equivalent provided with an operating arm 24. The present invention relates to the means for operating the arm 24, or an equivalent brake-operating device, by means which will compensate for the swiveling of the wheel and for the deflections of the spring 12.

Preferably the arm 24 is operated by a flexible tension element such as a cable 26 shown as passing over two vertical pulleys 28 and 30, and a horizontal pulley 32, and thence extending rearwardly to the usual operating connections carried by the chassis frame. The three pulleys 28 and 30 and 32 are carried by a linkage which compensates automatically for the deflections of spring 12, and which includes a pair of links 34 carrying the horizontal pulley 32 and connected by a horizontal pivot 36 to a bracket 38 secured to the chassis frame 14, and a pair of links 40 connected to the links 34 by a pivot 42 upon which the pulley 30 is mounted.

The links 40 are connected to a bracket 44 on the head of the king pin 18 by means such as pivot 46 upon which the pulley 28 is mounted. The outer end of the cable 26 extending over the pulley 28 and connected to the arm 24 extends substantially along the swiveling axis of the wheel, the position of the pivot 46 being offset inwardly to provide for this. It will be observed that the swiveling of the wheel is compensated for by the twisting of the vertically arranged end of the cable 26 while the deflections of the spring 12 are compensated for by the toggle action of the links 34 and 40 which maintain the length of the cable between the swiveling axis and the chassis frame substantially constant regardless of the spring deflections.

While one illustrative embodiment has been described in detail, it is not my intention to limit the scope of the invention to that particular embodiment or otherwise than by the terms of the appended claims.

I claim:

1. A vehicle having an axle and a frame supported by a spring upon the axle and having a wheel swiveled at one end of the axle and provided with a brake, and comprising, in combination therewith, a linkage connecting the frame and the end of the axle adjacent the brake and an operating connection for the brake supported by the linkage, the linkage being arranged to maintain the effective length of said connection substantially constant regardless of the deflections of the spring.

2. A vehicle having an axle and a spring supporting a frame upon the axle and a wheel having a brake swiveled at one end of the axle and comprising, in combination therewith, pivotally connected rigid links pivotally connected to the frame and pivotally supported adjacent the swiveling axis of the wheel, and brake-operating connections supported upon and guided by said links.

3. A vehicle having an axle and a spring supporting a frame upon the axle and a wheel having a brake swiveled at one end of the axle and comprising, in combination therewith, pivotally connected rigid links pivotally connected to the frame and pivotally supported adjacent the swiveling axis of the wheel, and a flexible tension element guided over said links and having its effective length between the frame and the wheel maintained substantially constant by said links regardless of the deflections of the spring.

4. A vehicle having an axle and a spring supporting a frame upon the axle and a wheel having a brake swiveled at one end of the axle and comprising, in combination therewith, pivotally connected rigid links pivotally connected to the frame and pivotally supported adjacent the swiveling axis of the wheel, and a flexible tension element guided over said links and having its effective length between the frame and the wheel maintained substantially constant by said links regardless of the deflections of the spring the end of the cable adjacent the brake extending substantially along the swiveling axis of the wheel and being arranged to compensate for the swiveling of the wheel.

5. A vehicle having an axle and a spring supporting a frame upon the axle and a wheel having a brake arranged at one end of the axle and comprising, in combination therewith, pivotally connected rigid links pivotally connected to the frame and pivotally supported adjacent the wheel, and a flexible tension element guided over said links and having its effective length between the frame and the wheel maintained substantially constant by said links regardless of the deflections of the spring.

6. A vehicle having an axle and a frame supported by a spring upon the axle having a wheel swiveled at one end of the axle and provided with a brake and comprising, in combination therewith a linkage connecting the frame and the end of the axle adjacent the brake and an operating connection for the brake supported by the linkage.

7. A vehicle having an axle and a frame supported by a spring on the axle and having a wheel swiveled on one end of the axle and provided with a brake and comprising, in combination therewith, a support structure connecting the frame and the end of the axle adjacent the brake and an operating connection for the brake supported thereby, said structure being arranged to maintain the effective length of said connection substantially constant regardless of the spring deflection.

In testimony whereof, I have hereunto signed my name.

ROY S. SANFORD.